United States Patent [19]

Shibata et al.

[11] Patent Number: 4,968,896
[45] Date of Patent: Nov. 6, 1990

[54] APPARATUS FOR ADJUSTING THE LIGHT PROJECTING ANGLE OF VEHICLE HEADLAMPS

[75] Inventors: Hiroki Shibata; Masahiro Kusaya; Nobumi Yokoyama, all of Shizuoka, Japan

[73] Assignee: Koito Manufacturing Co., Ltd., Tokyo, Japan

[21] Appl. No.: 282,773

[22] Filed: Dec. 12, 1988

[30] Foreign Application Priority Data

Dec. 10, 1987 [JP] Japan .................... 62-310889
Dec. 10, 1987 [JP] Japan .................... 62-310890
Nov. 4, 1988 [JP] Japan .................... 63-277274

[51] Int. Cl.⁵ .................... B60L 1/14; B60Q 1/10
[52] U.S. Cl. .................... 307/010.8; 362/71
[58] Field of Search .................... 307/10.8; 315/82, 77; 362/71, 285, 286, 428

[56] References Cited

U.S. PATENT DOCUMENTS

| | | | |
|---|---|---|---|
| 3,634,677 | 1/1972 | Stuttgart | 362/71 |
| 4,162,424 | 7/1979 | Zillgitt et al. | 362/71 X |
| 4,486,688 | 12/1984 | Schmitz | 307/10.8 X |
| 4,583,152 | 4/1986 | Kawai et al. | 307/10.8 X |
| 4,599,544 | 7/1986 | Martin | 307/10.8 X |
| 4,692,668 | 9/1987 | Brown | 315/77 X |
| 4,833,573 | 5/1989 | Miyauchi et al. | 362/71 |

*Primary Examiner*—William M. Shoop, Jr.
*Assistant Examiner*—Sharon D. Logan
*Attorney, Agent, or Firm*—Sughrue, Mion, Zinn, Macpeak & Seas

[57] ABSTRACT

A light projecting angle adjusting apparatus for a vehicle headlamp, where the division voltage points of a resistor device, across which a supply voltage is applied, are selected one at a time, to provide different division voltages as set voltages. A division voltage provided by a reference resistor device across which the supply voltage is applied is defined as a reference voltage which is compared with the selected set voltage. An output signal is generated according to the result of comparison and the light projecting angle of the headlamp is adjusted to a value which is determined from the output signal.

59 Claims, 9 Drawing Sheets

APPARATUS FOR ADJUSTING THE LIGHT PROJECTING ANGLE OF VEHICLE HEADLAMPS

BACKGROUND OF THE INVENTION

This invention relates to an apparatus for adjusting the light projecting angle of a vehicle headlamp. More particularly, the light projecting angle of the headlamp which is installed so as to be inclined with respect to the vehicle body can be changed in multiple steps by remote control from the driver's seat.

In motor vehicles, especially in automobiles, the vehicle body is coupled to the axles with suspension means comprising leaf springs and coiled springs. Therefore, when a heavy load is applied to the front end of the vehicle body (or to the rear end), the body tilts forward (or backward). As a result, the headlamp beam swings vertically. That is, the angle that light projects from the headlamp with respect to the road surface is changed. This in turn reduces the driver's ability to operate the vehicle safely. When the vehicle body is inclined backwards so that the headlamp beam is swung upwards, the driver in another vehicle approaching the vehicle may be dazzled by the headlamp beam.

In order to eliminate the above-described difficulty. Japanese Patent Application (OPI) No. 46733/1986 (the term "OPI" as used herein means an "unexamined published application") discloses a device for adjusting the light projecting angle. According to OPI 46733/1986 in order to correct the light projecting angle of the headlamp, the headlamp is installed so that it can be inclined with respect to the vehicle body, and the light projecting angle thereof is controlled by remote control from the driver's seat. FIG. 1 is a diagram illustrating the light projecting angle adjusting device thus disclosed. In such a device, the position of an operating switch 1, located in the driver's compartment, is changed to adjust the light projection angle of the headlamp (not shown).

This will now be described in greater detail. When the position of the operating switch 1 is changed so that the common terminal 1-0 of the operating switch 1 is connected to a switching terminal 1-5 thereof, current flows in a relay coil RL1 of a drive unit 2 through a slide contact 21d, a conductor pattern 22 and a slide contact 21a. As a result, the common terminal r11c of the normally open and normally closed contact means r11 of the relay coil RL1 is connected to the normal open contact terminal r11a. This in turn allows current to flow in a DC motor 24 in the direction of the arrow A. As a consequence the DC motor 24 is rotated in the forward direction, whereby the lamp drive shaft 25 is turned clockwise in the figure. As the lamp drive shaft 25 is turned clockwise in this manner, the light projecting angle of the head lamp is changed so that the headlamp beam swings upwards. At the same time, the sliding base plate 26 on which the conductor patterns 22 and 23 are formed is turned clockwise. When the slide contact 21d is disconnected from the conductor pattern 22, the relay coil RL1 is deenergized, so that the common terminal r11c of the contact means r11 is disconnected from the normally open contact terminal r11a. That is, the supply of the current to the DC motor 24 is interrupted. As a result, the light projecting angle of the headlamp is set to a certain value where the headlamp beam is swung upwards.

When the operating switch is returned to its original position where the common terminal 1-0 is connected to the switching terminal 1-4, current flows in another relay coil RL2 in the drive unit 2 through a slide terminal 21e, the conductor pattern 23 and a slide contact 21i, so that the common terminal r12c of the normally open and normally closed contact means of the relay coil RL2 is connected to a normally open contact terminal r12a. That is, current flows in the DC motor 24 in the direction of the arrow B to rotate the DC motor 24 in the reverse direction. The lamp drive shaft 25 is thus turned counterclockwise. Thus, the light projecting angle is changed so that the headlamp beam is swung downwards. As is apparent from the above description, with such a light projecting angle adjusting device, as the position of the operating switch is changed, the switching terminals 1-1 through 1-7 are selected one at a time, to change the light projecting angle in seven steps.

However the light projecting angle adjusting device of FIG. 1 suffers from a disadvantage that, as the number of light-projecting-angle adjusting steps increases, the number of lines connecting the operating switch to the drive unit also increases. In the light projecting angle adjusting device shown in FIG. 1, in order to adjust the light projecting angle in seven steps, it is necessary to use seven connecting lines L1 through L7 between the operating switch 1 and the drive unit 2. Since the drive unit 2 is installed along with the headlamp, in the front part of the vehicle body, a relatively large wiring hole, into which the connecting lines are inserted, must be formed in the partition wall between the engine compartment (outside the vehicle) and the driver compartment (inside the vehicle). In other words, as the number of connecting lines between the operating switch and the drive unit increases, the diameter of the wiring hole is increased. This in turn results in an increase in the noise coming from the engine compartment through the wiring hole into the driver compartment.

At the same time, as the number of connecting lines between the operating switch and the drive unit increases, the preVention rain drops or water drops flowing down the connecting lines from the headlamp installed outside the vehicle into the driver compartment becomes considerably more difficult (for instance by inserting the connecting lines respectively into small holes formed in a large diameter bushing). In addition, installation of the connecting lines is also rather difficult and troublesome.

SUMMARY OF THE INVENTION

Accordingly, an object of this invention is to eliminate the above-described difficulties accompanying a conventional device for adjusting the light projecting angle for vehicle headlamps.

The foregoing object has been achieved by the provision of an apparatus for adjusting the light projecting angle of a vehicle lamp in which the division voltage providing points of a resistor device, across which a supply voltage is applied, are selected one at a time, to provide different division voltages as set voltages. A division voltage provided by reference resistor means across which the supply voltage is applied is set as a reference voltage. This reference voltage is compared with the set voltage selected, and an output signal is generated according to the result of the comparison. The light projecting angle of the headlamp is then set to the value which is determined based on the output signal thus formed.

In the apparatus, the resistor device is installed inside the vehicle, and the set voltage provided by the resistor device is sent outside the vehicle. Therefore, the number of connecting lines leading into the driver compartment can be reduced to three lines. These three lines comprise two supply voltage lines connected to both ends of the resistor device, and one line for delivering the set voltage.

The foregoing object of the invention has been also achieved by the provision of another embodiment of the apparatus for adjusting the light projecting angle of the invention, in which the connecting points of first resistor device are selectively connected one at a time to a second resistor device. The second resistor device is connected in series through the first resistor device to the supply voltage source. As a result of such an arrangement, the series connection resistance of the first resistor means can be changed so that different division voltages are provided as set voltages at the connecting point of the first and second resistor devices. In addition, a division voltage provided by a reference resistor device, across which the supply voltage is applied, is set as a reference voltage so that the reference voltage and the selected set voltage are compared. A signal is generated based upon the result of the comparison therebetween, so that the light projecting angle of the headlamp is set to the value corresponding to the output signal thus formed.

According to the light projecting angle adjusting apparatus, the first resistor device is provided inside the vehicle while the second resistor device is located outside the vehicle so that the set voltage provided at the connecting point of the first and second resistor devices is transmitted out. Therefore, the number of connecting lines led into the driver compartment (inside the vehicle) can be decreased to only two. These two lines are the supply voltage line connected to the first resistor device, and the line for transmitting the set voltage.

DETAILED DESCRIPTION OF THE PREFERRED EMBODIMENTS

An apparatus for adjusting the light projecting angle of a headlamp on a vehicle (hereinafter referred to as "a light angle adjusting apparatus", when applicable) according to this invention will be described with reference to the accompanying drawings.

Figure 2:
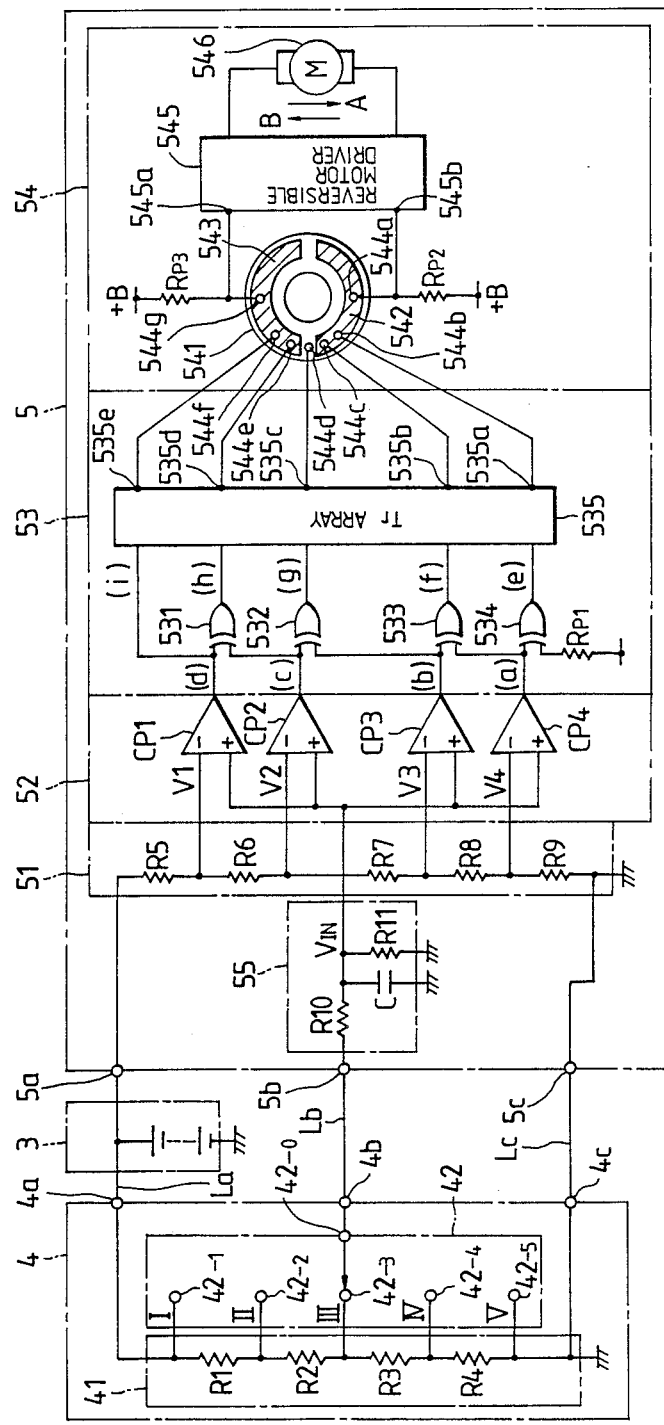
FIG. 2 is a circuit diagram showing a first embodiment of an apparatus for adjusting the light projecting angle of a vehicle headlamp according to this invention.

FIG. 2 is a circuit diagram, showing a first embodiment of the light angle adjusting apparatus according to the invention. In FIG. 2, reference numeral 4 designates a circuit for supplying a set voltage which is disposed inside the vehicle. Reference numeral 5 designates a headlamp drive unit which is mounted so that it can be tilted with respect to the vehicle body.

The circuit 4 for supplying a set voltage includes a set voltage resistor assembly 41 which is a series circuit of resistors R1 through R4. Also provided in the circuit 4 is a rotary operating switch 42. The voltage (DC 12 V) of a vehicle battery 3 is applied across the set voltage resistor assembly 41. That is, one end of the resistor assembly 41 is connected through its power source input terminal 4a to the positive terminal of the vehicle battery 3 and the other end is grounded in the circuit 4. The connecting point of the resistor R1 and the power source input terminal 4a is connected to the switching terminal 42-1 of the rotary operating switch 42. The connecting point of the resistors R1 and R2 is connected to the switching terminal 42-2. The connecting point of the resistors R2 and R3 is connected to the switching terminal 42-3. The connecting point of the resistors R3 and R4 is connected to the switching terminal 42-4. The grounding point of the resistor R4 is connected to the switching terminal 42-5 of the rotary operating switch 42. The common terminal 42-0 of the operating switch 42 is connected through its output terminal to the signal input terminal 5b of the drive unit 5. In the set voltage resistor assembly 41, the resistors R1 through R4 have equal resistance (R1=R2=R4=R ohms). Therefore, the division DC voltages 12 V, 9 V, 6 V, 3 V and 0 V of the set voltage resistor assembly 41 are provided at the switching terminals 42-1, 42-2, 42-3, 42-4 and 42-5 of the operating switch 42, respectively.

The drive unit 5 includes a reference voltage setting resistor assembly 51 which is a series circuit of resistors R5 through R9. Also provided is a voltage comparison circuit 52 including comparators CP1 through CP4 and an output signal generating circuit 53 including EX-OR circuits (hereinafter referred to merely as "EXs", when applicable) 531 through 534. Likewise, a transistor array 535 is located in the drive unit 5. The drive unit also has a light projecting angle adjusting circuit 54 for changing the light projecting angle of the headlamp to a value (position) corresponding to an output signal formed by the output signal forming circuit 53, and a fail safe circuit 55. The voltage of the vehicle battery 3 is applied across the reference voltage setting resistor assembly 51. That is, one end of the resistor assembly 51 is connected through its power source input terminal 5a to the positive terminal of the battery 3, and the other end is grounded in the drive unit 5. Division voltage V1 is provided at the connecting point of resistors R5 and R6. Division voltage V2 is provided at the connecting point of resistors R6 and R7. Division voltage V3 is provided at the connecting point of resistors R7 and R8. Division voltage V4 is provided at the connecting point of resistors R8 and R9. These division voltages, V1-V4 are applied to the inversion input terminals of the comparators CP1, CP2, CP3 and CP4 in the voltage comparison circuit 52, respectively. The division voltage provided through the common terminal 42-0 of the operating switch 42 in the set voltage supplying circuit 4 is applied to the non-inversion input terminals of the comparators CP1, CP2, CP3 and CP4.

The fail safe circuit 55 is made up of a protective resistor R10 connected between the non-inversion input terminals of the comparators CP1 through CP4 and the signal input terminal 5b of the drive unit 5, and a parallel circuit of a capacitor C and a resistor R11 which are connected between the non-inversion input terminals of the comparators CP1 through CP4 and ground. The resistance of the resistor R11 is set to a large value so that the capacitor C is gradually discharged through the resistor R11, during the discharge time. In the reference voltage providing resistor assembly 51, the resistors R6-R8 are equal in resistance to the resistors R1-R4 in the set voltage providing resist assembly 41 (R6=R7=R8 R ohms). The resistors R5 and R9 have half the value of the resistors R6 through R8 (R5=R9=½R ohms). Therefore, the reference voltages V1, V2, V3 and V4 provided at the inversion input terminals of the comparators CP1-CP4 are V1=10.4 V, V2=7.5 V, V3=4.5 V, and V4=1.5 V, respectively.

The output of the comparator CP1 in the voltage comparison circuit 52 is applied, as a signal (d), to one input terminal of the EX 531, and, as a signal (i) to the transistor array 535. The output of the comparator CP2 is applied as a signal (c), to the other input terminal of the EX 531 and to one input terminal of the EX 532. The output of the comparator CP3 is applied, as a signal (b), to the other input terminal of the EX 532 and to one input terminal of the EX 533. The output of the comparator CP4 is applied, as a signal (a), to the other input terminal of the EX 533 and to one input terminal of the EX 534. An "H" level signal is maintained through a pull-up resistor $R_{P1}$ to the other input terminal of the EX 534 at all times. The outputs of the EXs 531, 532, 533 and 534 are applied, respectively as signals (h), (g), (f) and (e), to the transistor array 535. When only the signal (e) is raised to "H" level, only the output terminal 535a is set to "L" level. When only the input signal (f) is raised to "H" level, the output terminal 535b is set to "L" level. Similarly, when only the input signal (g) is raised to "H" level, the output terminal 535c is set to "L" level. When only the input signal (h) is raised to "H" level, the output terminal 535d is set to "L" level. When only the input signal (i) is raised to "H" level, the output terminal 535e is set to "L" level.

The output terminals 535a-535e of the transistor array 535 are connected respectively to slide contacts 544b-544f. Slide contacts 544b-544f are slidably in contact with semi-circular belt shaped conductor patterns 542 and 543 formed on a sliding base board 541 in the light projecting angle adjusting circuit 54. The potential levels induced at slide contacts 544a and 544g are applied through input terminals 545a and 545b to a reversible motor driver 545. When "L" and "H" level signals are applied through the input terminals 545a and 545b, respectively, to the reversible motor driver 545, a drive current flows in DC motor 546 in the direction of the arrow A through the reversible motor driver 545, so that the DC motor is rotated in the forward direction. That is, the light projecting angle of the headlamp changes so that the headlamp beam is swung upwards while the sliding base board 541 is turned clockwise in FIG. 2. When "H" and "L" signals are applied through the input terminals 545a and 545b, respectively, to the reversible motor driver 545, a drive current flows in the DC motor 546 in the direction of the arrow B through the reversible motor driver 545, so that the DC motor 546 is rotated in the reverse direction. That is, the light projecting angle of the headlamp changes so that the headlamp beam is swung downwards, while the sliding base board 541 is turned counterclockwise in FIG. 2.

The slide contacts 544a and 544g in the light projecting angle varying circuit 54 are connected to a high potential power source through pull-up resistors $R_{P2}$ and $R_{P3}$, respectively. The grounding point in the circuit for supplying set voltages 4, and the grounding point in the drive unit 5 (i.e., the grounding point in the reference voltage setting resistor assembly 51) are connected through the grounding terminal 5c of the drive unit 5 to the grounding terminal 4c of the circuit for supplying set voltages 4.

Now, the operation of the light projecting angle adjusting apparatus according to the above-described structure will be described.

It is assumed that the common terminal 42-0 is connected to the switching terminal 42-3 (connection mode III) as shown in FIG. 2. In this case, the division voltage provided by the set voltage providing resistor assembly 41 through the common terminal 42-0 is 6 V. The division voltage 6 V is applied to the connecting point of the capacitor C and the resistor R10 in the fail safe circuit 55 of the drive unit 5. The division voltage 6 V is also supplied, as a set voltage $V_{IN}$, to the non-inversion input terminals of the comparators CP1-CP4. As a result of the set voltage being 6 V, the outputs of the comparators CP1, CP2, CP3 and CP4 are set to "L", "L", "H" and "H" level, respectively, and only the output of the EX 532 is raised to "H" level. Accordingly, only the output terminal 535c of the transistor array 535 is set to "L" level. As a result, in the state shown in FIG. 2 the input signals at the input terminals 545a and 545b of the reversible motor driver 545 are both at "H" level, and therefore no drive current flows in the DC motor 546 through the reversible motor driver 545. In other words the light projecting angle of the headlamp is maintained unchanged, i.e., the headlamp is maintained facing the direction which is determined from the rotational angular position of the motor 546. In this embodiment, this light projection angle of the head lamp is employed as the central position in the vertical wing of the headlamp.

Under this condition, when the operating switching 42 in the set voltages supplying circuit 4 is operated so that, for instance, the common terminal 42-0 is connected to the switching terminal 42-1, the division voltage provided by the circuit for supplying set voltages 4 is 9 V. The division voltage 9 V is provided at the connecting point of the resistor R10 and the capacitor C in the fail safe circuit 55 of the drive unit 5, and it is supplied, as a set voltage $V_{IN}$, to the non-inversion input terminals of the comparators CP1-CP4. As a result, the outputs of the comparators CP1-CP4 are set to "L", "H", "H" and "H" levels, respectively, and only the output of the EX 531 is raised to "H". Therefore, only the output terminal 535d of the transistor array 535 is set to "L" level. That is, the input signals at the input terminals 545a and 545b of the reversible motor driver 545 are at "L" and "H" levels, respectively. As a result, the drive current flows through the reversible motor driver 545 in the DC motor 546 in the direction of the arrow A. That is, the motor 546 is rotated in the forward direction, so that the light projection angle of the headlamp changes to swing the headlamp beam upwards. On the other hand, in association with the forward rotation of the DC motor 546, the sliding base board 541 is turned clockwise. When the slide contact 544e connected to the output terminal 535d of the transistor array 535 is disconnected from the conductor pattern 543 the input signal to the input terminal 545a of the reversible motor driver 545 is raised to "H" level. That is, the input signals at the input terminals 545a and 545b of the reversible motor driver 545 are both raised to "H" level, as a result of which the drive current to the DC motor 546 in the direction of the arrow A is interrupted and the DC motor is stopped. Accordingly the light projection angle of the headlamp is fixedly held at a certain value with the headlamp beam swung upwards.

When, in the set voltage supplying circuit 4, the common terminal 42-0 of the operating switch 42 is operated so that it is connected to the switching terminal 42-4, the division voltage provided by the set voltage resistor assembly 41 is 3 V. This division voltage 3 V is provided at the connecting point of the resistor R10 and the capacitor C in the fail safe circuit 55 in the drive unit 5, and it is supplied, as a set voltage $V_{IN}$, to the non-inversion input terminals of the comparators CP1–CP4. Because the voltage $V_{IN}$ is 3 V, the outputs of the comparators CP1, CP2, CP3 and CP4 are set to "L", "L", "L" and "H" level, respectively and only the output (f) of the EX 533 is raised to "H" level. Therefore, only the output terminal 535b of the transistor array 535 is set to "L" level. Accordingly, the input signals at the input terminals 545a and 545b of the reversible motor driver 545 are at "H" and "L" levels, respectively. As a result, the drive current flows through the reversible motor driver 545 in the DC motor 546 in the direction of the arrow B, so that the motor 546 is rotated in the reverse direction. That is, the light projecting angle of the headlamp changes in such a manner as to swing the headlamp beam downwards. On the other hand, in association with the reverse rotation of the DC motor 546, the sliding base board 541 is turned counterclockwise. When the slide contact 544c connected to the output terminal 535b of the transistor array 535 is disconnected from the conductor pattern 542, the input signal to the input terminal 545b of the reversible motor driver 545 is raised to "H" level. Thus, the input signals at the input terminals 545a and 545b of the reversible motor driver 545 are both at "H" level, and the DC motor 456 is stopped. As a result, the light projecting angle of the headlamp is maintained at a certain value with the headlamp beam swung downwards.

The following table 1 is a truth table indicating the connection modes of the operating switch 42 with the signals (a) through (i) in the light projecting angle adjusting apparatus according to the invention: In Table 1, connection modes I through V represent the connections of the common terminal 42-0 to the switching terminals 42-1 through 42-5, respectively.

TABLE 1

| Connection | $V_{IN}$ | (a) | (b) | (c) | (d) | (e) | (f) | (g) | (h) | (i) |
|---|---|---|---|---|---|---|---|---|---|---|
| I | 12V | H | H | H | H | L | L | L | L | H |
| II | 9V | H | H | H | L | L | L | L | H | L |
| III | 6V | H | H | L | L | L | L | H | L | L |
| IV | 3V | H | L | L | L | L | H | L | L | L |
| V | 0V | L | L | L | L | H | L | L | L | L |

As is apparent from the truth table, as the connection mode of the operating switch 42 is changed, the "H" level position is shifted in the signals (e) through (i) applied to the transistor array 535 separately according to the position. Thus, the light projecting angle of the headlamp is set to the value corresponding to the "H" level position in the signals (e) through (i) applied to the transistor array 535.

With the light projecting angle adjusting apparatus of the invention, the set voltage providing circuit 4 provided on the inside of the vehicle, can be connected to the drive unit 5 attached to the headlamp with three connecting lines La, Lb and Lc, in order to control the light projecting angle. As a result, the wiring hole formed in the partition between the engine compartment and the inside of the vehicle can be made small. This suppresses the introduction of noises from the engine compartment into the driver compartment through the wiring hole. Furthermore, the number of connecting lines is very small, only three. Therefore, simple means can be employed to prevent the flow of raindrops or water down the connecting lines from the headlamp into the driver compartment, and the installation of the connecting lines can be easily achieved.

In the first embodiment of the invention, the set voltage $V_{IN}$ for the voltage comparison circuit 52 is provided through the fail save circuit 55. Therefore, even if operating switch 42 is mistakenly changed, momentarily interrupting the provision of the division voltage from the set voltage resistor assembly the charge voltage of the capacitor C in the fail safe circuit 55 maintains the set voltage $V_{IN}$ substantially equal to the preceding set voltage provided before the switching. Therefore, the light projecting angle can be stably switched at all times.

When the application of the division voltage from the set voltage resistor assembly 41 to the drive unit is suspended for a long period of time for instance because the connecting line Lb is broken, the capacitor C in the fail safe circuit is gradually discharged through the resistor R11. Therefore, the set voltage $V_{IN}$ for the voltage comparison circuit 52 becomes zero (0). As a result, the light projecting angle of the headlamp is gradually changed and set to the value corresponding to the connection mode V so that the headlamp beam is swung to its maximum downwards position. Therefore, when the connecting line Lb is broken while the light projecting angle of the headlamp is adjusted so that the headlamp beam is swung upwards, in the period of time determined by the time constant of the capacitor C and the resistor R11 in the fail safe circuit 55, the light projecting angle of the headlamp will be changed so that the headlamp beam is swung downwards, and fixed. This will prevent the operators in vehicles moving towards one another from being dazzled by the headlamp beams.

Figure 3:
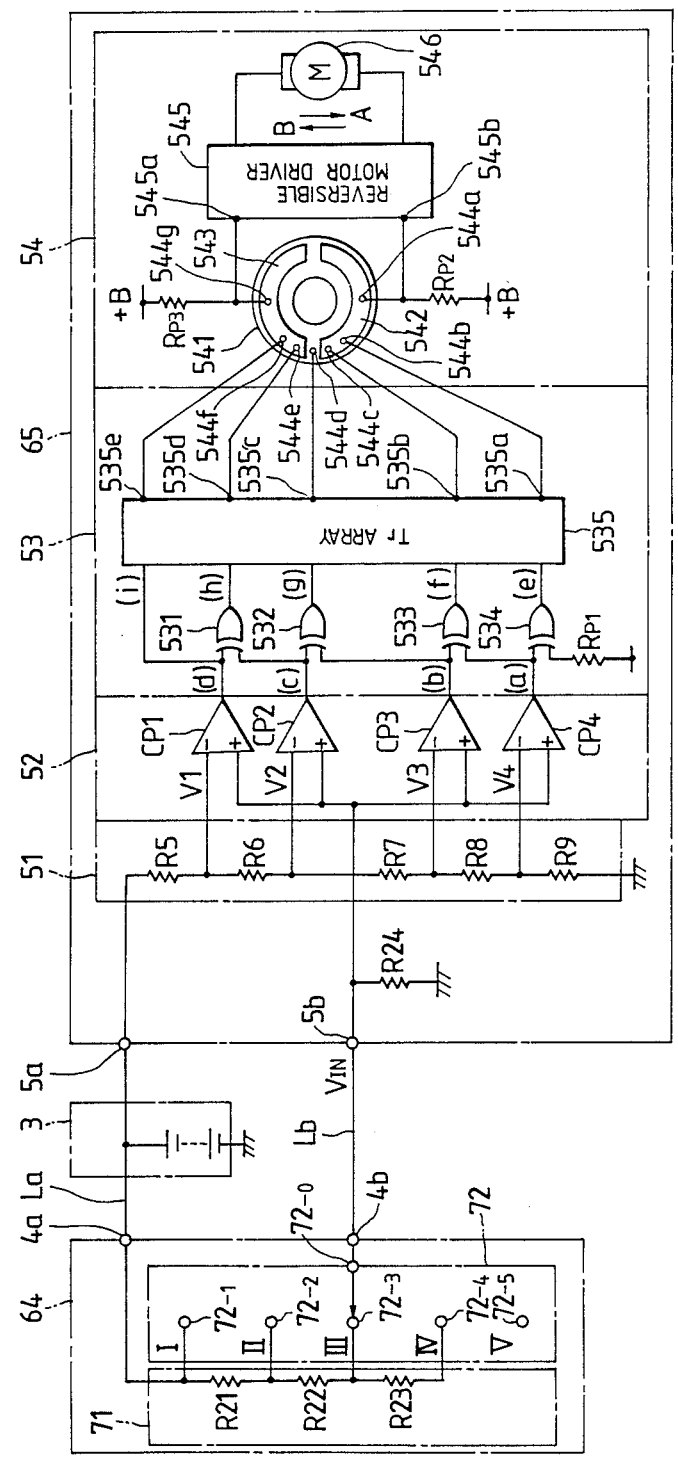
FIG. 3 is a circuit diagram showing a second embodiment of an apparatus for adjusting the light projecting angle of a vehicle headlamp according to this invention.

FIG. 3 is a circuit diagram showing a second embodiment of the light projecting angle adjusting apparatus according to the invention. The apparatus of FIG. 3 is generally equal in arrangement to that of FIG. 2. Therefore, only the differences therebetween will be described.

In FIG. 3, a set voltage supplying circuit 64 includes first resistance device, namely, a set voltage resistor assembly which is a series circuit of resistors R21–R23 and a rotary operating switch 72. The first resistance device; i.e., the set voltage resistor assembly 71 is connected in series to second resistance means; i.e., a resistor R24 in a drive unit 65 through the operating switch 72. The voltage (DC 12 V) of a battery 3 is applied to the series circuit of the set voltage providing resistor assembly 71 and the resistor R24. In the set voltage providing resistor assembly 71, the resistance of the resistor R22 is twice as high as that of the resistor R21 (R22=2 R (where R is the resistance of the resistor R21)), and the resistance of the resistor R23 is six times as high as that of the resistor R21 (R23=6 R). The resistance of the resistor R24 in the drive unit 65 is three times as high as that of the resistor R21 (R24=3 R). Therefore, when the position of the operating switch 72 is changed to connect its common terminal 72-0 to its switching terminal 72-1 (connection mode I), the series connection resistance of the set voltage resistor assembly 71 for the resistor R24 is zero (0), and the supply voltage 12 V is provided at the common terminal 72-0. When the connection mode of the operating switch 72 is changed to connect the common terminal 72-0 to its switching terminal 72-2 (connection mode II), the series connection resistance of the set voltage resistor assembly 71 for the resistor R24 is R (ohms), and a division voltage of 9 v is provided at the common terminal 72-0 of the operating switch 72. Similarly, when the common terminal 72-0 is connected to a switching terminal 72-3 (connection mode III), a division voltage of 6 V is provided at the common terminal 72-0 of the operating assembly 72. When the common terminal 72-0 is connected to a switching terminal 72-4 (connection mode IV), a division voltage of 3 V is provided at the common terminal 72-0. When the common terminal 72-0 is connected to a switching terminal 72-5 (connection mode V), the earth voltage (0 V) is provided at the common terminal, because the switching terminal 72-5 is not connected to the battery.

The division voltage provided at the common terminal 72-0 of the operating switch 72, i.e., at the connecting point of the resistor R24 in the drive unit 65 and the set voltage resistor assembly 71 in the set voltage supplying circuit 64 is supplied, as a set voltage $V_{IN}$, to the non-inversion input terminals of comparators CP1, CP2, CP3 and CP4.

In the second example of the light providing angle adjusting apparatus shown in FIG. 3, the set voltage resistor assembly 71 is grounded through the resistor R24 in the drive unit 65, and therefore it is unnecessary to provide grounding means in the set voltage supplying circuit 64. Thus, the construction thereof is simplified. Furthermore, the number of connecting lines led from the engine compartment into the driver compartment can be reduced to only two. Namely, a supply voltage line for applying the voltage of the battery to the first resistance means, and a set voltage output line. In addition in the apparatus of FIG. 3, it is unnecessary to use the fail safe circuit 55 shown in FIG. 2.

Figure 4:
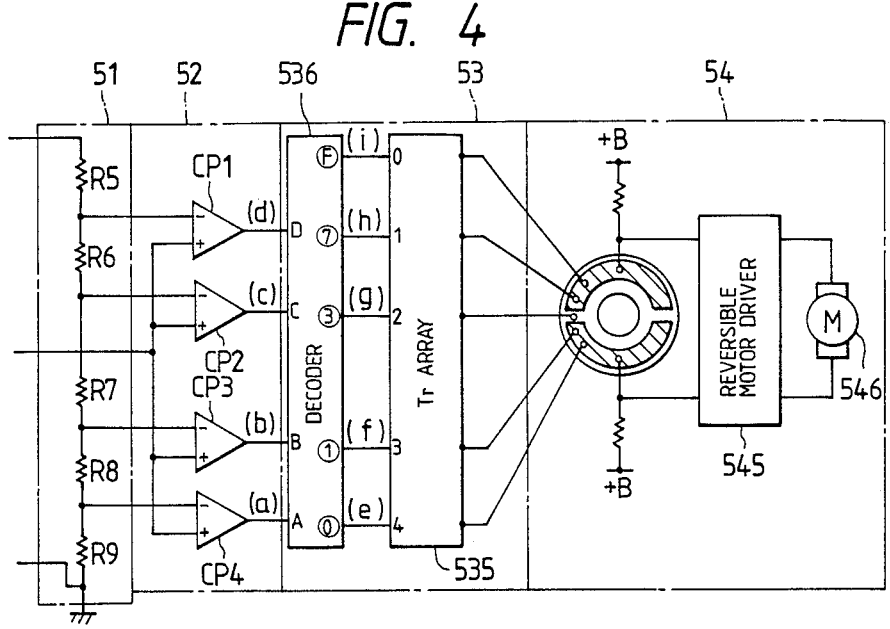
FIGS. 4, 5 and 6 are circuit diagrams showing examples of a drive unit in the light projecting angle adjusting device according to the invention.

In the above-described first and second embodiments of the light angle adjusting apparatus according to the invention, the signals (a) through (d) provided by the voltage comparison circuit 52 are processed by the EXs 531–534, the outputs of which are applied to the transistor array 535. However, the output signals (a) through (d) of the voltage comparison circuit 52 may be processed by means of a binary-hexadecimal decoder 536 as shown in FIG. 4. The following Table 2 is a truth table indicating the positions of the operating switch 42 (or 72) with the input and output signals of the binary-hexadecimal decoder 536.

TABLE 2

| Connection | $V_{IN}$ | (a) | (b) | (c) | (d) | (e) | (f) | (g) | (h) | (i) |
|---|---|---|---|---|---|---|---|---|---|---|
| I   | 12V | H | H | H | H | L | L | L | L | H |
| II  | 9V  | H | H | H | L | L | L | L | H | L |
| III | 6V  | H | H | L | L | L | L | H | L | L |
| IV  | 3V  | H | L | L | L | L | H | L | L | L |
| V   | 0V  | L | L | L | L | H | L | L | L | L |

Figure 5:
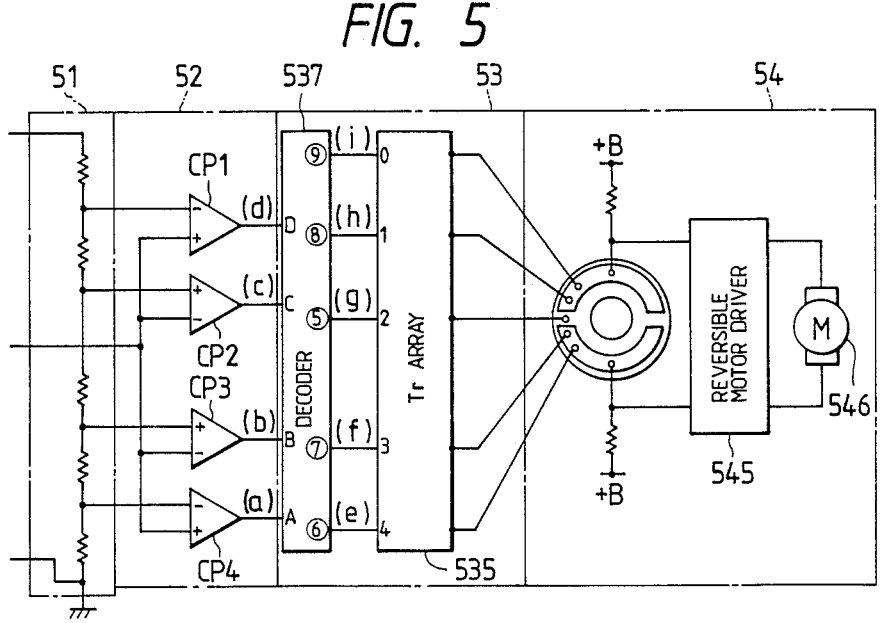

If, in the voltage comparison circuit 52 shown in FIG. 4, the non-inversion input terminal and the inversion input terminal of each of the comparators CP2 and CP3 are interchanged as shown in FIG. 5, then the output signals (a) through (d) of the voltage comparison circuit 52 change with respect to the position of the operating switch 42 (or 72) as listed in the following Table 3. Therefore, as shown in FIG. 5, the output signal forming circuit 53 can use a binary-decimal decoder 537. In this case, the package structure can be made smaller than when the binary-hexadecimal decoder 536 is employed.

TABLE 3

| Connection | $V_{IN}$ | (a) | (b) | (c) | (d) | (e) | (f) | (g) | (h) | (i) |
|---|---|---|---|---|---|---|---|---|---|---|
| I   | 12V | H | L | L | H | L | L | L | L | H |
| II  | 9V  | H | L | L | L | L | L | L | H | L |
| III | 6V  | H | L | H | L | L | L | H | L | L |
| IV  | 3V  | H | H | H | L | L | H | L | L | L |
| V   | 0V  | L | H | H | L | H | L | L | L | L |

Figure 6:
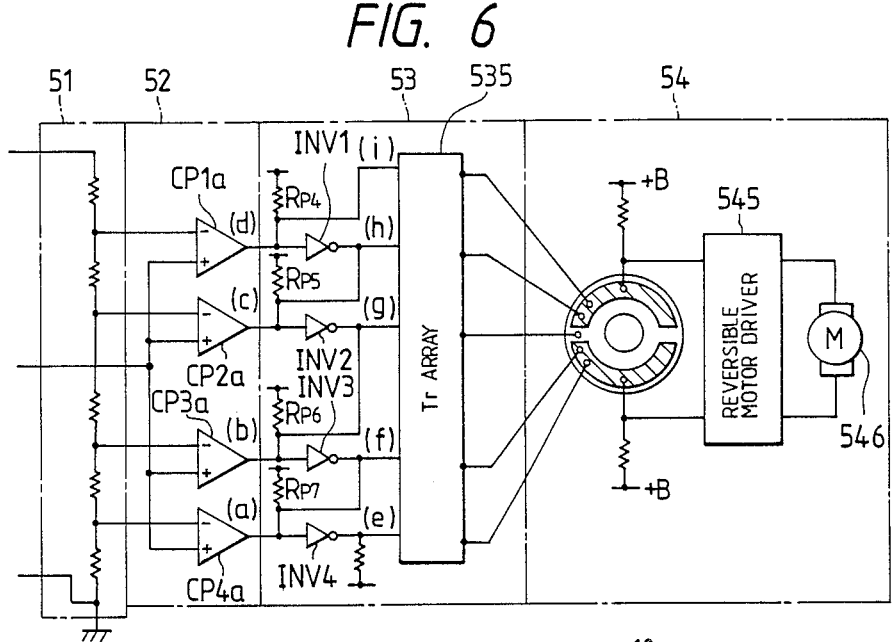

The voltage comparison circuit 52 may be made up of open collector type comparators CP1a–CP4a as shown in FIG. 6. The output terminals of the comparators CP1a–CP4a are connected respectively through pull-up resistors $R_{P4}$–$R_{P7}$ to the high potential power source, and are connected to open collector type inverters INV1–INV4, respectively, which are connected to the transistor array 535 as shown. In this case, with respect to the positions of the operating switch 42 (or 72), the following truth table (Table 4) is obtained. With the circuitry described above, in the output signal forming circuit 53, the supply voltage, DC 12 V, can be directly used. That is, the output signal forming circuit 53 has a higher voltage withstanding value than that using the decoder 536 shown in FIG. 4 or the decoder 537 shown in FIG. 5 (generally decoders operate on DC 5 V), and it has greater stability against voltage noises.

TABLE 4

| Connection | $V_{IN}$ | (a) | (b) | (c) | (d) | (e) | (f) | (g) | (h) | (i) |
|---|---|---|---|---|---|---|---|---|---|---|
| I   | 12V | H | H | H | H | L | L | L | L | H |
| II  | 9V  | H | H | H | L | L | L | L | H | L |
| III | 6V  | H | H | L | L | L | L | H | L | L |
| IV  | 3V  | H | L | L | L | L | H | L | L | L |
| V   | 0V  | L | L | L | L | H | L | L | L | L |

Figure 1:
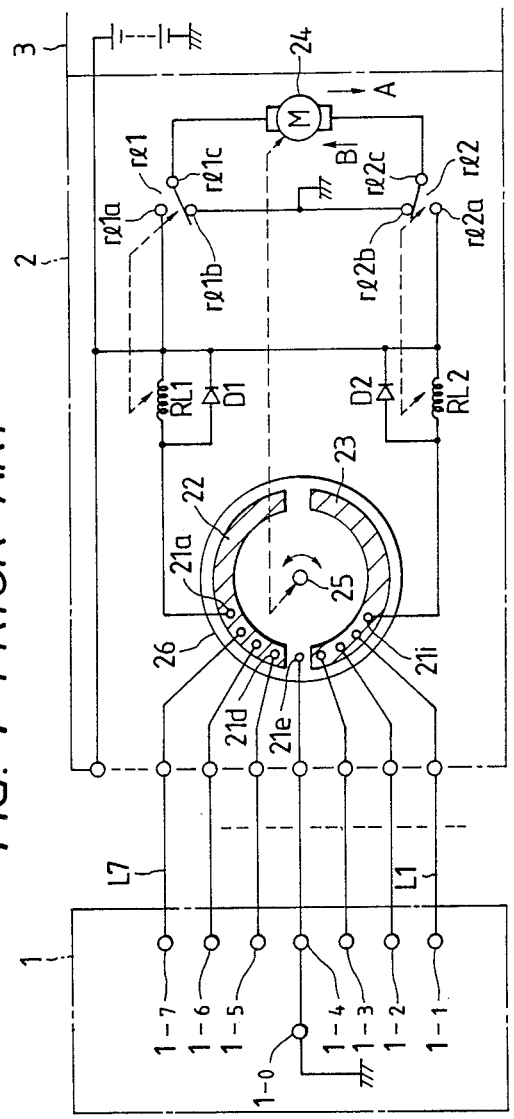
FIG. 1 is a diagram showing the operating principle of a conventional light projecting angle adjusting device for a vehicle headlamp.

In each of the above-described embodiments, the reversible motor driver 545 is employed to drive the DC motor 546 to change the direction of rotation of the DC motor 546. However, it goes without saying that a driving method using the relay means in the conventional light projecting angle adjusting apparatus shown in FIG. 1 may be employed.

In the light projecting angle varying circuit 54, the drive contact mechanism for changing the light projecting direction of the headlamp is made up of the conductor patterns 542 and 543 and the slide contacts 544a–544g slidably provided thereon. However, it should be noted that the invention is not limited thereto or thereby. For instance, the drive contact mechanism may be formed as shown in FIG. 7.

Figure 7:
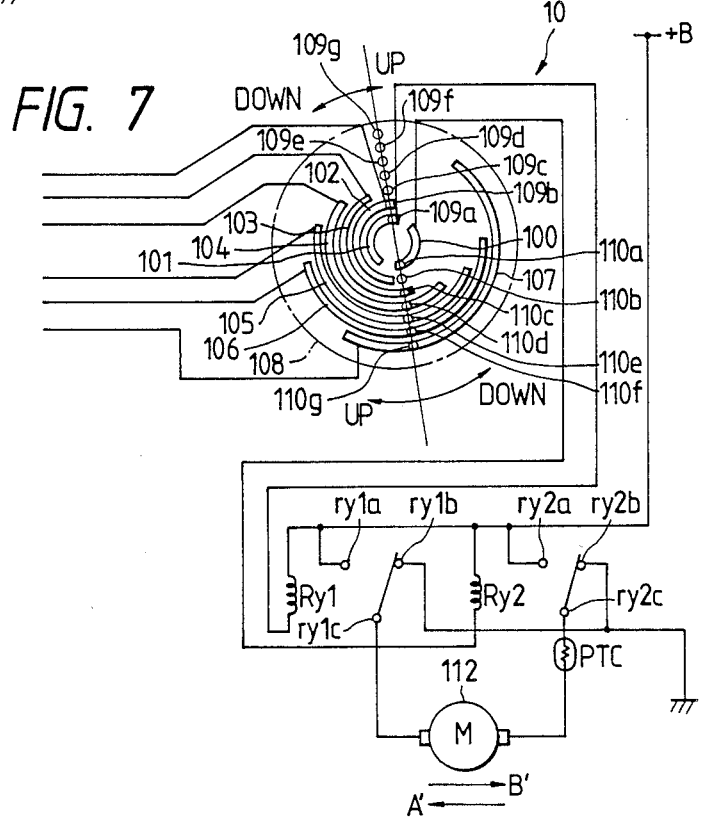
FIG. 7 is an explanatory diagram showing one modification of a drive contact mechanism for changing the light projecting angle of the headlamp.
Figure 8:
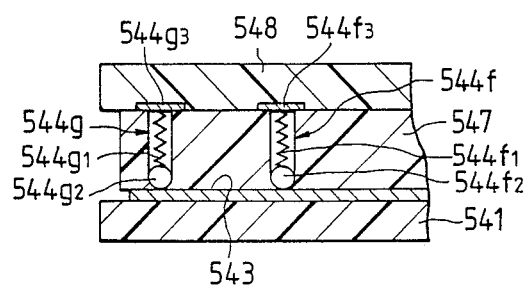
FIG. 8 is a sectional side view showing essential components of the drive contact mechanism employed in each of the devices of FIGS. 1 through 6.

FIG. 8 is a sectional side view showing essential components of the slide contact mechanism of FIG. 7. The slide contact mechanism includes conductor patterns 542 and 543 and slide contacts 544a–544g (only the slide contacts 544g and 544f shown). The structure of the slide contact 544g, as a typical example, will be described. A ball contact $544g_2$ is pushed against the conductor pattern 543 by an electrically conductive compression coil spring $544g_1$, and the compression coil spring $544g_1$ and the ball contact $544g_2$ are inserted in an insulating member 547 such as "Duracon (trade name)". The insulating member 547 is fixedly secured to a fixing base plate 548. The compression coiled spring $544g_1$ is connected to a terminal plate $544g_3$ on the base plate 548, and the slide contact 544g is electrically led to the outside through the terminal plate $544g_3$. In the slide contact mechanism thus constructed, when for instance the terminal plate $544f_3$ of the slide contact 544f is set to "L" level, then current flows in the path of the terminal plate $544g_3$ of the slide contact 544g, the compression coil spring $544g_1$, the ball contact $544g_2$, the conductor pattern 543, the ball contact $544f_2$ of the slide contact 544f, the compression coil spring $544f_1$, and the terminal plate $544f_3$. In addition, ball contacts of the slide contacts being pushed against the conductor pattern, the sliding base plate 541 is turned. When ball contact $544f_2$ is disconnected from the conductor pattern 543, the sliding base plate 541 is stopped.

Referring back to FIG. 7, the drive contact mechanism 10 is high in durability and can be manufactured at low cost. The construction and operation of the mechanism 10 will be described in more detail.

Figure 9:
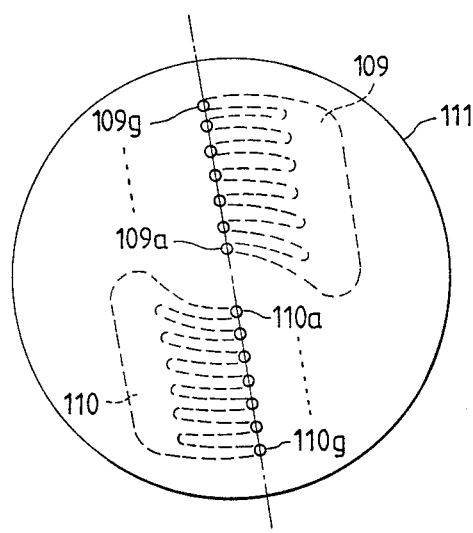
FIG. 9 is a plan view of a sliding base plate used in combination with a stationary base plate in the drive contact mechanism shown in FIG. 7.
Figure 10:
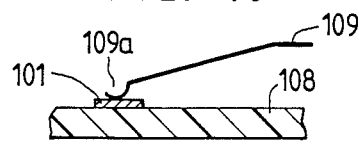
FIG. 10 is a sectional side view showing the contact of a slide contact secured to the sliding base plate with a contact track formed on the stationary base plate.

In FIG. 7, reference numerals 100–107 designate arcuate conductor patterns (hereinafter referred to as "contact tracks", when applicable) formed on a stationary base plate 108 (indicated by the one-dot chain line in FIG. 7). Slide contacts 109a–109g and slide contacts 110a–110g are in contact with the contact tracks as shown in FIG. 7. When the light projecting angle of the headlamp is at the first position (on in the initial position). FIG. 9 shows a sliding base plate 111 which is used in combination with the stationary base plate 108. A slide contact plate 109 including the slide contacts 109a–109g, and another slide contact plate 110 including the slide contacts 110a–110g are fixedly secured to the sliding base plate 111. Therefore, when the sliding base plate 111 is combined with the stationary base plate 108, then the slide contact 109 is brought into contact with the contact track 101 as shown in FIG. 10. In the drive contact mechanism thus constructed, the high potential power source is applied through relay coils Ry2 and Ry1 to the contact tracks 100 and 101, and output signals of "H" level or "L" level are applied to the remaining contact tracks 102 through 107.

When an "L" level output signal is applied to the contact track 103, then current flows in the path of the relay coil Ry2, the contact track 100, the slide contact 110a, the slide contact 110c, and the contact track 103. As a result, in the relay coil Ry2, the common terminal ry2c thereof is electrically connected to the normally open contact terminal ry2a thereof, and current flows in the motor 112 in the direction of the arrow A'. That is, the motor is rotated in the forward direction, to swing the headlamp beam downwards and simultaneously to turn the sliding base plate 111 counterclockwise (in the figure) with respect to the stationary base plate 108. When the slide contact 110c is disconnected from the contact track 103, the relay coil Ry2 is deenergized. As a result, the common terminal ry2c is electrically disconnected from the normally open contact terminal ry2a, so that the supply of current to the motor 112 is interrupted. Thus, the light projecting angle of the headlamp is fixed at a predetermined position (the second position) with the headlamp beam swung downwards. On the other hand, in this operation, the contact track 102 is in standby state, being in contact with the slide contact 109. Similarly, when, in the case where an "L" level output signal is applied to the contact track 104, the slide contact is disconnected from the contact track, the relay coil Ry2 is deenergized, and the light projecting angle of the headlamp is fixed at the third position with the headlamp beam swung downwards. When, in the case where an "L" level output signal is applied to the contact rack 105, the slide contact is disconnected from the contact track, the relay coil Ry2 is deenergized, and the light projecting angle of the headlamp is fixed at the fourth position with the headlamp swung downwards. In the case where an "L" level output is applied to the contact track 106, the slide contact is disconnected from the contact track 106, the relay coil Ry2 is deenergized, and the light projecting angle of the headlamp is fixed at the fifth position. When, in the case where an "L" level output signal is applied to the contact track 107 the slide contact is disconnected form the contact track 107, the relay coil Ry2 is deenergized, and the light projecting angle of the headlamp is set to the sixth position. In this operation, the contact tracks 103, 104, 105 and 106 are in standby state being in contact with the slide contacts 109c, 109d, 109e and 109f, respectively. Accordingly, when the contact track 102 is set to "L" level with the light projecting angle of the headlamp held at the sixth position, current flows in the path of the relay coil ry1, the contact track 101, the slide contact 109a, the slide contact 109b and the slide track 102, so that, in the relay coil Ry1, the common terminal ry1c is electrically connected to the normally open contact terminal ry1a, and current flows in the motor 112 in the direction of the arrow B'. That is, the motor 112 is rotated in the reverse direction. As a result, the light projecting angle of the headlamp changes in such a manner that the headlamp beam is swung upwards, while the sliding base plate 111 is turned clockwise (in the figure) with respect to the stationary base plate 108. When the slide contact 109b is disconnected from the contact tracks 102, the relay coil Ry1 is deenergized, so that the supply of current to the motor 112 is interrupted, and the light projecting angle of the headlamp is returned so that the headlamp beam is at the first position.

With the drive contact mechanism thus constructed and operated, the frequency of contact between the slide contacts and the slide tracks is relatively low, and therefore, wear is decreased and the durability is increased. In addition, since it is of simple construction, the drive contact mechanism can be manufactured at low cost.

In the above-described embodiments of the invention, one end of the set voltage resistor assembly 41 is connected to the positive terminal of the vehicle battery 3, and the division voltages provided at the common terminal of the operating switch 42. That is, the division voltages proVided at the connecting point of the first resistance means, namely, the set Voltage resistor assembly 41 and the second resistor means, namely, the resistor R4, are employed as the set voltages $V_{IN}$. However, the light angle adjusting apparatus may be so designed that one end of the set voltage resistor assembly 41 is set free, and the supply voltage is applied through the resistor R4 to the common terminal 42-0 of the operating switch.

Figure 11:
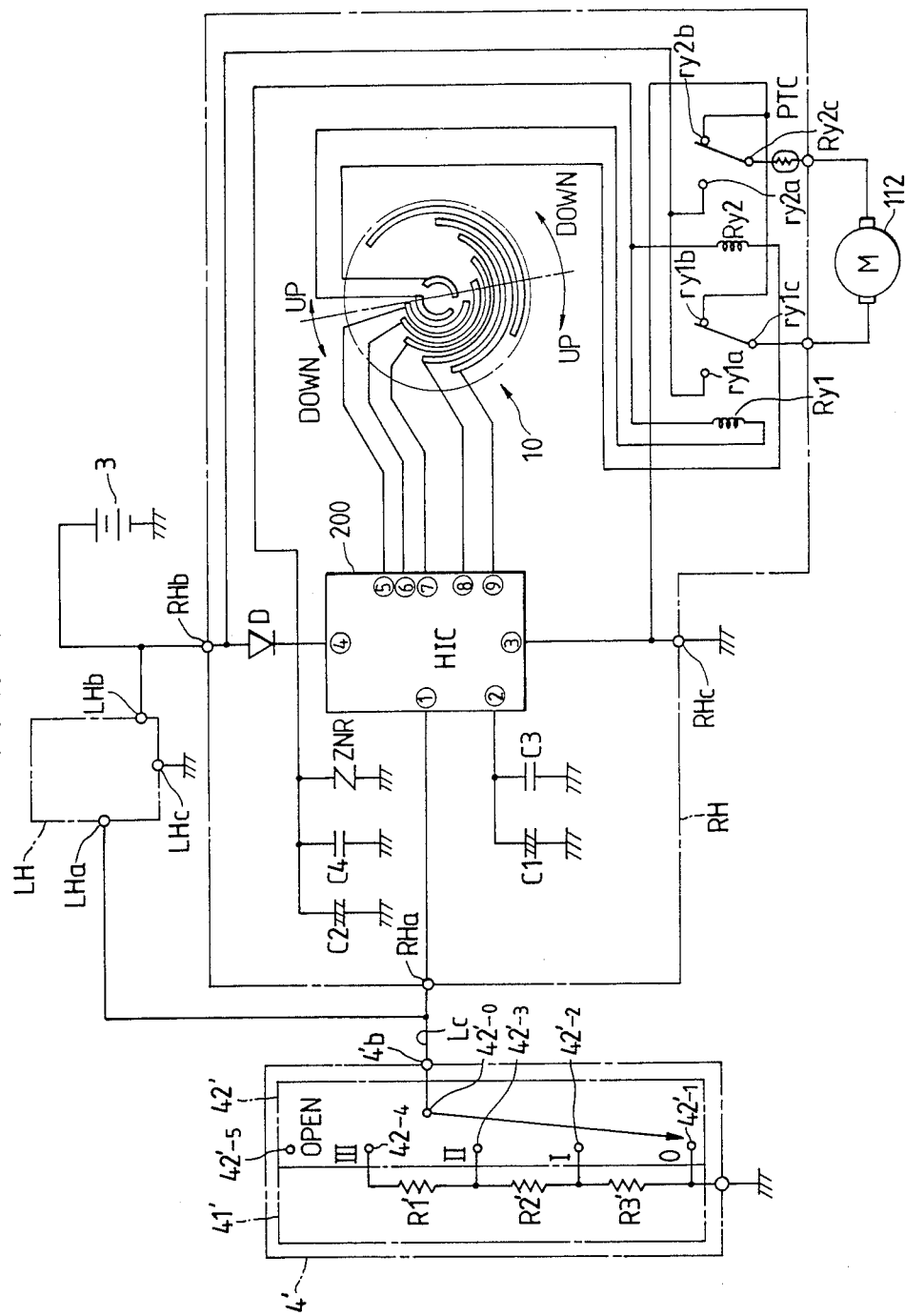
FIG. 11 is a circuit diagram showing another embodiment of an apparatus for adjusting the light projecting angle according to the invention.

FIG. 11 is a circuit diagram showing an example of the light projecting angle adjusting apparatus according to the invention in which the drive contact mechanism shown in FIG. 7 is employed. Here, one end of a set voltage providing resistor assembly 41' is set free whereas the other end thereof is grounded, so that the supply voltage is directly applied to the common terminal 42'-0 of an operating switch 42'. In FIG. 11, reference character LH designates a drive unit provided for the left headlamp, and RH, a drive unit provided for the right headlamp. The drive unites RH and LH being equal in construction, only the drive unit RH is shown in detail.

As shown in FIG. 11, in a circuit for supplying set voltages 4', the common terminal 42'-0 of the operating switch 42' is connected through an output terminal 4'b to a signal and voltage supplying common input terminal RHa of the drive unit RH. The common input terminal RHa is connected to a terminal (1) of a hybrid IC (hereinafter referred to merely as "an HIC", when applicable) 200 in the interior of the drive unit RH. A parallel circuit of capacitors C1 and C3 is connected to a terminal (2) of the HIC 200, and the positive terminal of the vehicle battery 3 is connected through a diode D to a terminal (4) of the HIC 200. In the drive contact mechanism 10 supply voltage for the relay coils Ry1 and Ry2 is obtained from the cathode of the diode D, and supply voltage for the motor 112 is obtained from the anode of the diode D. A parallel circuit of capacitors C2 and C4 and a Zener diode ZNR is connected to the terminal (4) of the HIC 200, and a terminal (3) thereof is grounded to the chassis. The remaining terminals (5), (6), (7), (8) and (9) of the HIC 200 are connected to the contact tracks 102, 103, 104, 105 and 106, respectively.

Figure 12:
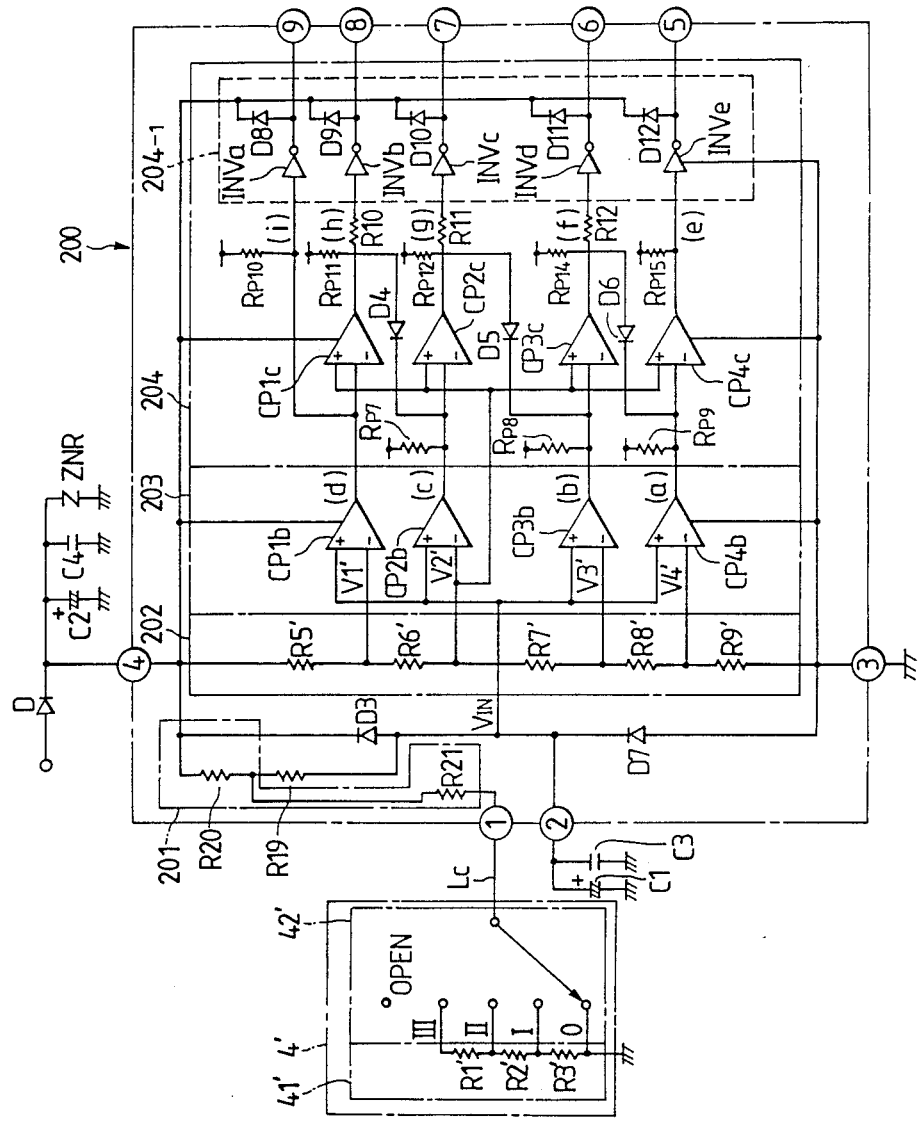
FIG. 12 is a circuit diagram showing the arrangement of a hybrid IC in the adjusting apparatus shown in FIG. 11.

FIG. 12 shows an concrete example of the internal arrangement of the HIC 200. As shown in FIG. 12, the terminal (1) is connected through a series circuit of resistors R20 and R21 to the terminal (4). That is, the supply voltage is applied through a second resistance device, namely, the series circuit 201 to a first resistance device, namely the set voltage resistor assembly 41', so that difference division voltages provided at the connecting point of the resistors R20 and R21 separately, are applied according to the positions of the operating switch 42', as set voltages $V_{IN}$, to the non-inversion input terminals of open collector type comparators CP1b–CP4b in a voltage comparison circuit 203. Whereas division voltages V1', V2', V3' and V4' provided respectively at the connecting points of resistors R5', R6', R7', R8' and R9', forming a reference voltage providing resistor assembly 202, are applied, as reference voltages, to the inversion input terminals of the comparators CP1b–CP4b, respectively. The outputs of the comparators CP1b–CP4b in the voltage comparison circuit 203 are applied, as signals (d), (c), (b) and (a), to the inversion input terminals of open collector type comparators CP1c–CP4c in an output signal forming circuit 204, respectively. The reference voltage V2' is applied to the non-inversion input terminals of the comparators CP1c–CP4c. The outputs of the comparator CP1b and of the comparators CP1c–CP4c are applied to inverters INVa–INVe in a transistor array 204-1, respectively. The output terminals of the inverters INVa–INVe are connected to the above-described terminals (9)–(5) of the hybrid IC 200, respectively. In order to prevent leak-in of current in forming wired OR circuits, diodes D4, D5 and D6 are connected between the output terminals of the comparators CP1c and CP2b, between the output terminals of the comparators CP2c and CP3b, and between the output terminals of the comparators CP3c and CP4b, respectively.

The following Table 5 is a truth table indicating the positions of the operating switch 42' with the levels of the signals (a) through (i) in the light angle adjusting apparatus thus organized:

TABLE 5

| Connection | $V_{IN}$ | (a) | (b) | (c) | (d) | (e) | (f) | (g) | (h) | (i) |
|---|---|---|---|---|---|---|---|---|---|---|
| I | 12V | H | H | H | H | L | L | L | L | H |
| II | 9V | H | H | H | L | L | L | L | H | L |
| III | 6V | H | H | L | L | L | L | H | L | L |
| IV | 3V | H | L | L | L | L | H | L | L | L |
| V | 0V | L | L | L | L | H | L | L | L | L |

As is apparent from the truth table, as the position of the operating switch 42' is changed, the "H" level position is shifted in the signals (e) through (i) applied to the transistor array 204. That is, the light angle of the right headlamp is changed by the drive contact mechanism to the value which is determined from the "H" level position in the signals (a) through (e).

With the light projecting angle adjusting apparatus thus constructed, the set voltage resistor assembly 41' arranged on the inside of the vehicle can be connected to the drive unit RH (or LH) with only one connecting line for adjustment of the light angle of the headlamp. Therefore, the wiring hole formed in the partition wall between the engine compartment and the driver compartment can be made smaller than that in the case of the light angle adjusting apparatus described with reference to FIG. 1. Furthermore, with the light projecting angle adjusting apparatus designed as shown in FIG. 12, the hybrid IC 200 can directly use the DC 12 V power source.

In the above-described embodiments of the invention, the operating switch in the set voltage providing circuit is manually operated. However, the invention may be modified so that an inclination angle sensor is provided, and in response to the output signal of the sensor, the connection mode of the operating switch is automatically changed to control the light projecting angle of the headlamp. Furthermore, in the above-described embodiments, the headlamp beam is swung vertically, however, it goes without saying that the technical concept of the invention can be equally applied to the case where the headlamp beam is swung horizontally.

As was described above, in the vehicle headlamp angle adjusting apparatus according to the invention, the division voltage providing points of the resistor means across which the supply voltage is applied are suitably selected one at a time, so that different division voltages are provided as set voltages. At the same time, a division voltage provided by the reference resistor device, across which the supply voltage is applied is set as a reference voltage so that the set voltage selected is compared with the reference voltage. According to the result of comparison, an output signal is generated, so that the light projecting angle of the headlamp is changed to the value which is determined from the output signal. Therefore, if the resistor means is provided in the driver compartment, and the set voltages provided by the resistor means are sent into the engine compartment, then the number of connecting lines feeding into the driver compartment from the engine compartment can be limited to three (3). Two supply voltage lines connected to both ends of the resistor means, and one set voltage introducing line make up the three lines. The wiring hole formed in the partition wall between the driver compartment and the engine compartment can be made small to suppress the noise which is introduced through the wiring hole into the driver's room. Furthermore, since the number of connecting lines is small, as described above, the flow of rain and water drops down the connecting lines into the driver's room can be readily prevented, and the connecting lines can be readily installed.

In another of the light projecting angle adjusting devices according to the invention, the second resistor device connected in series, through the first resistor device, to the supply voltage source is connected selectively to the connecting points of the first resistor device, so that the series resistance of the first resistor device is changed, and different division voltages are provided as set voltages at the connecting point of the first and second resistor devices. Simultaneously, a division voltage provided by the reference resistor device, across which the supply voltage is applied, is set as a reference voltage so that the set voltage is compared with the reference voltage. According to the result of comparison, an output signal is generated, and the light projecting angle of the headlamp is set to the value which is determined from the output signal. Therefore if the first resistor device is provided inside the driver compartment, while the second resistor device is provided outside the driver compartment, and the set voltage provided at the connecting point of the first and second resistor device is output, then the number of connecting lines feeding into the driver compartment can be reduced to only two. These two lines are the supply voltage line connected to the first resistor device, and the set voltage introducing line. If the apparatus is designed so that the supply voltage is applied to the first resistor device through the second resistor device, then the number of connecting lines introduced into the driver compartment can be reduced to only one, namely the line connecting the first resistor device to the second resistor device.

What is claimed is:

1. An apparatus for adjusting a light projecting angle of a vehicle headlamp comprising:
    means for supplying a st voltage comprising resistor means and switching means coupled to said resistor means, wherein division voltage points of said resistor means are selectable by said switching means one at a time to provide a first division voltage as said set voltage when a supply voltage is applied across said resistor means; and
    a drive unit comprising:
    reference voltage setting means for setting a reference voltage to a second division voltage provided by reference resistor means across which said supply voltage is applied;
    voltage comparison means for comparing said reference voltage and said set voltage provided by said means for supplying voltages;
    means for generating an output signal according to the output of said voltage comparison means; and
    means for adjusting said light projecting angle to a value which is determined from said output signal formed by said means for generating an output signal.

2. An apparatus for adjusting a light projecting angle of a vehicle headlamp comprising:
    means for supplying st voltages, wherein connecting points of first resistor means are selectively connected one at a time to second resistor means disposed in a drive unit, said second resistor means being connected in series, through said first resistor means, to a supply voltage source, wherein the series connection resistance of said first resistor means is varied in accordance with said connecting points, so as to provide a first division voltage as a set voltage, at the connecting point of said first and second resistor means: and
    a drive unit comprising:
    reference voltage setting means for setting as a reference voltage a second division voltage provided by reference resistor means across which said supply voltage is applied;
    voltage comparison means for comparing said reference voltage and said set voltages provided by said means for supplying set voltages;
    means for generating an output signal according to the output of said voltage comparison means; and
    means for adjusting said light projecting angle to a value which is determined from said output signal formed by said means for generating an output signal.

3. An apparatus for adjusting a light projecting angle of a vehicle headlamp as claimed in claim 1, wherein said means for supplying set voltages is manually operated.

4. An apparatus for adjusting a light projecting angle of a vehicle headlamp as claimed in claim 2, wherein said means for supplying set voltages is manually operated.

5. An apparatus for adjusting a light projecting angle of a vehicle headlamp as claimed in claim 1, further comprising an inclination angle sensor, wherein said means for supplying set voltages is automatically operated in response to an output of said sensor.

6. An apparatus for adjusting a light projecting angle of a vehicle headlamp as claimed in claim 2, further comprising an inclination angle sensor, wherein said means for supplying set voltages is automatically operated in response to an output of said sensor.

7. An apparatus for adjusting a light projecting angle of a vehicle headlamp as claimed in claim 1, wherein said resistor means is disposed inside a driver compartment of said vehicle and said resistor means is connected to said drive unit by three lines extending from said driver compartment to an engine compartment.

8. An apparatus for adjusting a light projecting angle of a vehicle headlamp as claimed in claim 7, wherein said three lines comprise two lines for transmitting said supply voltage and a line for transmitting said set voltage.

9. An apparatus for adjusting a light projecting angle of a vehicle headlamp as claimed in claim 2, wherein said first resistor means is disposed inside a driver compartment of said vehicle and said second resistor means is disposed outside said driver compartment, said first and second resistor means are connected to one another by two lines.

10. An apparatus for adjusting a light projecting angle of a vehicle headlamp as claimed in claim 9, wherein said two lines comprise a line for transmitting said supply voltage and a line for transmitting said set voltage.

11. An apparatus for adjusting a light projecting angle of a vehicle headlamp as claimed in claim 2, wherein said supply voltage is applied to said first resistor means through said second resistor means, said first resistor means is disposed inside a driver compartment of said vehicle and said second resistor means is disposed outside said driver compartment, wherein said first and second resistor means are connected to one by a single line.

12. An apparatus for adjusting a light projecting angle of a vehicle headlamp as claimed in claim 1, wherein said resistor means comprises a plurality of resistors connected in series.

13. An apparatus for adjusting a light projecting angle of a vehicle headlamp as claimed in claim 12, wherein said division voltage points are connected to switching terminals of said switching means.

14. An apparatus for adjusting a light projecting angle of a vehicle headlamp as claimed in claim 13, wherein a common terminal of said switching means is connected to an input of said drive unit.

15. An apparatus for adjusting a light projecting angle of a vehicle headlamp as claimed in claim 14, wherein said reference voltage setting means comprises a plurality of resistors connected in series.

16. An apparatus for adjusting a light projecting angle of a vehicle headlamp as claimed in claim 15, wherein said reference voltage setting means is connected to ground.

17. An apparatus for adjusting a light projecting angle of a vehicle headlamp as claimed in claim 16, wherein said second division voltage is produced at a connecting point between two adjacent ones of said plurality of resistors.

18. An apparatus for adjusting a light projecting angle of a vehicle headlamp as claimed in claim 16, wherein said reference voltage setting means is connected to ground through one of said plurality of resistors, and said reference voltage setting means is connected to said supply voltage through another of said plurality of resistors, wherein said one of said resistors and said another of said resistors each have half the resistance of the remainder of said plurality of resistors.

19. An apparatus for adjusting a light projecting angle of a vehicle headlamp as claimed in claim 17, wherein said voltage comparison means comprises a plurality of comparators.

20. An apparatus for adjusting a light projecting angle of a vehicle headlamp as claimed in claim 19, wherein said means for generating an output signal comprises a plurality of exclusive OR circuits and a transistor array.

21. An apparatus for adjusting a light projecting angle of a vehicle headlamp as claimed in claim 20, wherein said second division voltage is applied to an inversion terminal of one of said plurality of comparators.

22. An apparatus for adjusting a light projecting angle of a vehicle headlamp as claimed in claim 21, wherein said set voltage is applied to a non-inverting terminal of said one of said plurality of comparators, through said common terminal of said switching means and said input to said drive means.

23. An apparatus for adjusting a light projecting angle of a vehicle headlamp as claimed in claim 22, further comprising a fail safe circuit connected between said common terminal and said input to said drive means.

24. An apparatus for adjusting a light projecting angle of a vehicle headlamp as claimed in claim 23, wherein said fail safe circuit comprises:
a protective resistor connected between said non-inverting terminals of said comparators and said input to said drive unit;
a capacitor connected between said non-inverting terminals of said comparators and ground; and
a second resistor connected in parallel to said capacitor, between said non-inverting terminals of said comparators and ground.

25. An apparatus for adjusting a light projecting angle of a vehicle headlamp as claimed in claim 20, wherein said transistor array has a plurality of outputs, said plurality of outputs being connected to slide contacts, said slide contacts being in slidable contact with arcuate shaped conductor patterns disposed on a sliding base plate, said sliding base plate being disposed in said means for adjusting.

26. An apparatus for adjusting a light projecting angle of a vehicle headlamp as claimed in claim 25, wherein said means for adjusting further comprises a motor driver and a DC motor.

27. An apparatus for adjusting a light projecting angle of a vehicle headlamp as claimed in claim 26, wherein potential levels induced in said slide contacts by said outputs of said transistor array are applied to first and second terminals of said motor driver.

28. An apparatus for adjusting a light projecting angle of a vehicle headlamp as claimed in claim 27, wherein when a potential level applied to said first terminal is low and a potential level applied to said second terminal is high said motor is driven in a first direction, and said projecting angle of said headlamp relative to a horizontal plane is increased and said sliding base plate is rotated in a first direction.

29. An apparatus for adjusting a light projecting angle of a vehicle headlamp as claimed in claim 28, wherein when a potential level applied to said first terminal is high and a potential level applied to said second terminal is low said motor is driven in a second direction, and said projecting angle of said headlamp relative to a horizontal plane is decreased and said sliding base plate is rotated in a direction opposite said first direction.

30. An apparatus for adjusting a light projecting angle of a vehicle headlamp as claimed in claim 27, wherein when a potential level applied to said first terminal is low and a potential level applied to said second terminal is high said motor is driven in a first direction, and said projecting angle of said headlamp relative to a vertical plane is increased and said sliding base plate is rotated in a first direction.

31. An apparatus for adjusting a light projecting angle of a vehicle headlamp as claimed in claim 28, wherein when a potential level applied to said first terminal is high and a potential level applied to said second terminal is low said motor is driven in a second direction, and said projecting angle of said headlamp relative to a vertical plane is decreased and said sliding base plate is rotated in a direction opposite said first direction.

32. An apparatus for adjusting a light projecting angle of a vehicle headlamp as claimed in claim 29, wherein when a slide contact of one of said plurality of outputs of said transistor array supplying said potential level is disconnected from slide contact with said arcuate conductor patterns due to said rotation of said sliding base plate, current to said motor driver is terminated and said headlamp is maintained in a position it reached just prior to said disconnection.

33. An apparatus for adjusting a light projecting angle of a vehicle headlamp as claimed in claim 15, wherein said reference voltage setting means and said resistor means of said means for supplying a set voltage are commonly grounded.

34. An apparatus for adjusting a light projecting angle of a vehicle headlamp as claimed in claim 2, wherein said means for supplying a set voltage comprises said resistor means and a switching means.

35. An apparatus for adjusting a light projecting angle of a vehicle headlamp as claimed in claim 34, wherein said resistor means comprises a plurality of resistors connected in series.

36. An apparatus for adjusting a light projecting angle of a vehicle headlamp as claimed in claim 35, wherein said division voltage points are connected to switching terminals of said switching means.

37. An apparatus for adjusting a light projecting angle of a vehicle headlamp as claimed in claim 36, wherein a common terminal of said switching means is connected to an input of said drive means.

38. An apparatus for adjusting a light projecting angle of a vehicle headlamp as claimed in claim 2, wherein said reference voltage setting means comprises a plurality of resistors connected in series.

39. An apparatus for adjusting a light projecting angle of a vehicle headlamp as claimed in claim 38, wherein said reference voltage setting means is connected to ground.

40. An apparatus for adjusting a light projecting angle of a vehicle headlamp as claimed in claim 39, wherein said second division voltage is produced at a connecting point between two adjacent ones of said plurality of resistors.

41. An apparatus for adjusting a light projecting angle of a vehicle headlamp as claimed in claim 40, wherein said reference voltage setting means is connected to ground through one of said plurality of resistors, and said reference voltage setting means is connected to said supply voltage through another of said plurality of resistors, wherein said one of said resistors and said another of said resistors have half the resistance of the remainder of said plurality of resistors.

42. An apparatus for adjusting a light projecting angle of a vehicle headlamp as claimed in claim 41, wherein said voltage comparison means comprises a plurality of comparators.

43. An apparatus for adjusting a light projecting angle of a vehicle headlamp as claimed in claim 41, wherein said means for generating an output signal comprises a plurality of exclusive OR circuits and a transistor array.

44. An apparatus for adjusting a light projecting angle of a vehicle headlamp as claimed in claim 43, wherein said second division voltage is applied to an inversion terminal of one of said plurality of comparators.

45. An apparatus for adjusting a light projecting angle of a vehicle headlamp as claimed in claim 44, wherein said set voltage is applied to a non-inverting terminal of said one of said plurality of comparators, through said common terminal of said switching means and said input to said drive means.

46. An apparatus for adjusting a light projecting angle of a vehicle headlamp as claimed in claim 43, wherein said transistor array has a plurality of outputs, said plurality of outputs being connected to slide contacts, said slide contacts being in slidable contact with arcuate shaped conductor patterns disposed on a sliding base plate, said sliding base plate being disposed in said means for adjusting.

47. An apparatus for adjusting a light projecting angle of a vehicle headlamp as claimed in claim 46, wherein said means for adjusting further comprises a motor driver and a DC motor.

48. An apparatus for adjusting a light projecting angle of a vehicle headlamp as claimed in claim 47, wherein potential levels induced in said slide contacts by said outputs of said transistor array are applied to first and second terminals of said motor driver.

49. An apparatus for adjusting a light projecting angle of a vehicle headlamp as claimed in claim 48, wherein when a potential level applied to said first terminal is low and a potential level applied to said second terminal is high said motor is driven in a first direction, and said projecting angle of said headlamp relative to a horizontal plane is increased and said sliding base plate is rotated in a first direction.

50. An apparatus for adjusting a light projecting angle of a vehicle headlamp as claimed in claim 49, wherein when a potential level applied to said first terminal is high and a potential level applied to said second terminal is low said motor is driven in a second direction, and said projecting angle of said headlamp relative to a horizontal plane is decreased and said sliding base plate is rotated in a direction opposite said first direction.

51. An apparatus for adjusting a light projecting angle of a vehicle headlamp as claimed in claim 48, wherein when a potential level applied to said first terminal is low and a potential level applied to said second terminal is high said motor is driven in a first direction, and said projecting angle of said headlamp relative to a vertical plane is increased and said sliding base plate is rotated in a first direction.

52. An apparatus for adjusting a light projecting angle of a vehicle headlamp as claimed in claim 49, wherein when a potential level applied to said first terminal is high and a potential level applied to said second terminal is low said motor is driven in a second direction, and said projecting angle of said headlamp relative to a vertical plane is decreased and said sliding base plate is rotated in a direction opposite said first direction.

53. An apparatus for adjusting a light projecting angle of a vehicle headlamp as claimed in claim 50, wherein when a slide contact of one of said plurality of outputs of said transistor array supplying said potential level is disconnected from slide contact with said arcuate conductor patterns due to said rotation of said sliding base plate, current to said motor driver is terminated and said headlamp is maintained in a position it reached just prior to said disconnection.

54. An apparatus for adjusting a light projecting angle of a vehicle headlamp as claimed in claim 20, wherein said means for generating an output signal comprises a binary hexidecimal decoder.

55. An apparatus for adjusting a light projecting angle of a vehicle headlamp as claimed in claim 42, wherein said means for generating an output signal comprises a binary hexidecimal decoder.

56. An apparatus for adjusting a light projecting angle of a vehicle headlamp as claimed in claim 20, wherein said comparators are open collector type comparators, the outputs of which are connected through pull-up resistors to a high potential power source and to open collector type inverters, the outputs of said inverters being connected to said transistor array.

57. An apparatus for adjusting a light projecting angle of a vehicle headlamp as claimed in claim 42, wherein said comparators are open collector type comparators, the outputs of which are connected through pull-up resistors to a high potential power source and to open collector type inverters, the outputs of said inverters being connected to said transistor array.

58. An apparatus for adjusting a light projecting angle of a vehicle headlamp as claimed in claim 20, wherein said means for generating an output signal comprises a binary decimal decoder and two of said plurality of comparators have their inverting and non-inverting terminals reversed.

59. An apparatus for adjusting a light projecting angle of a vehicle headlamp as claimed in claim 42, wherein said means for generating an output signal comprises a binary decimal decoder and two of said plurality of comparators have their inverting and non-inverting terminals reversed.

* * * * *